(12) United States Patent
Leppard

(10) Patent No.: US 8,225,060 B2
(45) Date of Patent: Jul. 17, 2012

(54) DATA DE-DUPLICATION BY PREDICTING THE LOCATIONS OF SUB-BLOCKS WITHIN THE REPOSITORY

(76) Inventor: Andrew Leppard, Dulwich (AU)

( * ) Notice: Subject to any disclaimer, the term of this patent is extended or adjusted under 35 U.S.C. 154(b) by 358 days.

(21) Appl. No.: 12/581,046

(22) Filed: Oct. 16, 2009

(65) Prior Publication Data

US 2011/0093664 A1 Apr. 21, 2011

(51) Int. Cl.
*G06F 12/00* (2006.01)
(52) U.S. Cl. ......... 711/162; 711/114; 707/664; 707/692
(58) Field of Classification Search .................. 711/154, 711/162
See application file for complete search history.

(56) References Cited

U.S. PATENT DOCUMENTS

| 5,990,810 | A | 11/1999 | Williams |
| 2005/0091234 | A1* | 4/2005 | Hsu et al. ..................... 707/100 |
| 2008/0016131 | A1* | 1/2008 | Sandorfi et al. ............... 707/204 |

OTHER PUBLICATIONS

"DXi-Series Disk Backup Systems with Data De-Duplication: Providing Comprehensive Data and System Integrity", *Quantum Technical Brief,* www.quantum.com, 2007.

* cited by examiner

*Primary Examiner* — Matthew Bradley
*Assistant Examiner* — Kalpit Parikh

(57) ABSTRACT

A computer-enabled method of storing an input dataset in a storage medium includes storing a copy for each of a plurality of repeatable blocks of data in an input dataset in a storage medium. The process further includes finding a location in the storage medium of the copy of a block of data in the input dataset. Finding the location includes determining a most likely location in the storage medium of the copy of the block of data from one or more blocks of data preceding the block of data based on statistics of past stored data. Finding the location further includes if the determined most likely location contains a block of data that matches with the actual block of data, retrieving the location in the storage medium of the copy of the block of data. The process also includes storing the location of the copy of the block of data.

14 Claims, 11 Drawing Sheets

| | Link(s) | |
|---|---|---|
| [subblock(n-1), subblock(n)] = [X1, Y] | Link to next subblock Z1 | |
| | Link to next subblock Z2 | |
| | ⋮ | |
| [subblock(n-1), subblock(n)] = [X2, Y] | Link to next subblock Z3 | |
| | Link to next subblock Z4 | |
| | ⋮ | |
| ⋮ | | |

FIG. 7

DATA DE-DUPLICATION BY PREDICTING THE LOCATIONS OF SUB-BLOCKS WITHIN THE REPOSITORY

BACKGROUND

1. Field

This invention relates generally to data storage, and more specifically to systems and processes for data de-duplication.

2. Related Art

Data de-duplication is a technique used in data storage to increase storage efficiency by detecting and removing redundant data. Only unique blocks of data are actually stored in a repository, such as one or more disks or tapes. Redundant data is typically replaced with pointer references to the unique data copy.

Data de-duplication operates by segmenting a dataset, e.g., a stream of backup data, into a sequence of unique sub-blocks and writing those blocks to a disk target or repository. Each sub-block is assigned a unique identifier, e.g., a hash value, based on the data within the sub-block. This identifier is typically stored in an index (a sub-block index) that maps the sub-block's identifier to the location in the repository where the sub-block is stored. A duplicate sub-block within the dataset is detected when the sub-block's identifier matches one of the identifiers in the sub-block index. Instead of storing the sub-block again, a pointer to the original sub-block may be stored in the dataset's metadata (data about the dataset), thereby improving storage efficiency.

Although each identifier occupies very little space, the sub-block index may potentially contain a very large number of identifiers. Therefore, the sub-block index may be too big to fit into memory; instead, it is stored on a storage medium that typically has slower random access time, e.g., a disk. As a result, sub-block index lookups may be costly in terms of access time.

The number of sub-block index lookups may be reduced by caching. For example, a cache may be used to store recently added sub-blocks, recently matched sub-blocks, the most popular sub-blocks, or the like. However, these methods do not reduce the number of sub-block index lookups for sub-blocks that are less common or have not been recently seen.

SUMMARY

According to some aspects of the inventions provided herein, processes and systems for storing an input dataset in a storage medium are provided. In one aspect provided herein, a computer-enabled method of storing an input dataset in a storage medium is provided. In one example, the process includes storing a copy for each of a plurality of repeatable blocks of data in an input dataset in a storage medium. The process further includes finding a location in the storage medium of the copy of a block of data in the input dataset. Finding the location includes determining a most likely location in the storage medium of the copy of the block of data from one or more blocks of data preceding the block of data based on statistics of past stored data. Finding the location further includes if the determined most likely location contains a block of data that matches with the actual block of data, retrieving the location in the storage medium of the copy of the block of data. The process also includes storing the location of the copy of the block of data.

The copy for each of the plurality of repeatable blocks of data may be associated with a corresponding set of metadata. In some examples, determining the most likely location in the storage medium of the copy of the block of data may include determining using an $n^{th}$ order Markov chain. In some examples, determining the most likely location in the storage medium of the copy of the block of data may include determining from a block of data preceding the block of data using a first order Markov chain. In some examples, determining the most likely location in the storage medium of the copy of the block of data comprises determining from two blocks of data preceding the block of data using a second order Markov chain.

In some examples, the statistics of past stored data may include statistics of the order of past stored data, wherein the statistics is stored in one or more sets of metadata, and wherein the one or more sets of metadata are associated with the copy of the one or more blocks of data preceding the block of data.

In some examples, retrieving the location in the storage medium of the copy of the block of data may include accessing one or more sets of metadata, wherein the one or more sets of metadata are associated with the copy of the one or more blocks of data preceding the block of data. In some examples, storing the location of the copy of the block of data may include storing the location in a set of metadata representing the input dataset.

In other aspects, systems, apparatuses, and a computer-readable storage medium comprising computer executable instructions for storing an input dataset in a storage medium are provided. For example, a computer-readable storage medium may include computer executable instructions for storing an input dataset in a storage medium. The instructions may include storing a copy for each of a plurality of repeatable blocks of data in an input dataset in a storage medium. The instructions may further include finding a location in the storage medium of the copy of a block of data in the input dataset. Finding the location includes determining a most likely location in the storage medium of the copy of the block of data from one or more blocks of data preceding the block of data based on statistics of past stored data. Finding the location further includes if the determined most likely location contains a block of data that matches with the actual block of data, retrieving the location in the storage medium of the copy of the block of data. The instructions may further include storing the location of the copy of the block of data.

According to some aspects of the inventions provided herein, processes and systems for storing an input dataset in a storage medium using clusters are provided. In one aspect provided herein, a computer-enabled method of storing an input dataset in a storage medium using clusters is provided. In one example, the process includes storing a copy for each of a plurality of repeatable blocks of data in an input dataset in a storage medium, wherein each copy is associated with one of a plurality of clusters. The process further includes finding a location in the storage medium of the copy of a block of data in the input dataset. Finding the location includes determining a most likely location in the storage medium of a first cluster from a second at least one cluster based on statistics of past stored data, wherein the first cluster is associated with the block of data, and wherein the second at least one cluster is associated with the one or more blocks of data preceding the block of data. Finding the location further includes if the determined most likely location contains a first cluster associated with the block of data, retrieving the location in the storage medium of the copy of the block of data. The process also includes storing the location of the copy of the block of data.

Each of the plurality of clusters may be associated with a corresponding set of metadata. In some examples, determining the most likely location in the storage medium of the first cluster may include determining from a cluster associated with a block of data preceding the block of data using a first order Markov chain. In some examples, determining the most likely location in the storage medium of the first cluster may include determining from one or more clusters associated with two blocks of data preceding the block of data using a second order Markov chain.

In some examples, the statistics of past stored data comprises statistics of the order of past stored data, wherein the statistics is stored in one or more sets of metadata associated with one or more clusters, and wherein the one or more clusters are associated with the copy of the one or more blocks of data preceding the block of data.

In some examples, retrieving the location in the storage medium of the copy of the block of data may include accessing one or more sets of metadata associated with one or more clusters, wherein the one or more clusters are associated with the copy of the one or more blocks of data preceding the block of data.

In other aspects, systems, apparatuses, and a computer-readable storage medium comprising computer executable instructions for storing an input dataset in a storage medium using clusters are provided.

BRIEF DESCRIPTION OF THE FIGURES

The present application can be best understood by reference to the following description taken in conjunction with the accompanying drawing figures, in which like parts may be referred to by like numerals:

FIG. 7 illustrates an exemplary link data structure for a second order Markov chain.

DETAILED DESCRIPTION

The following description is presented to enable a person of ordinary skill in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
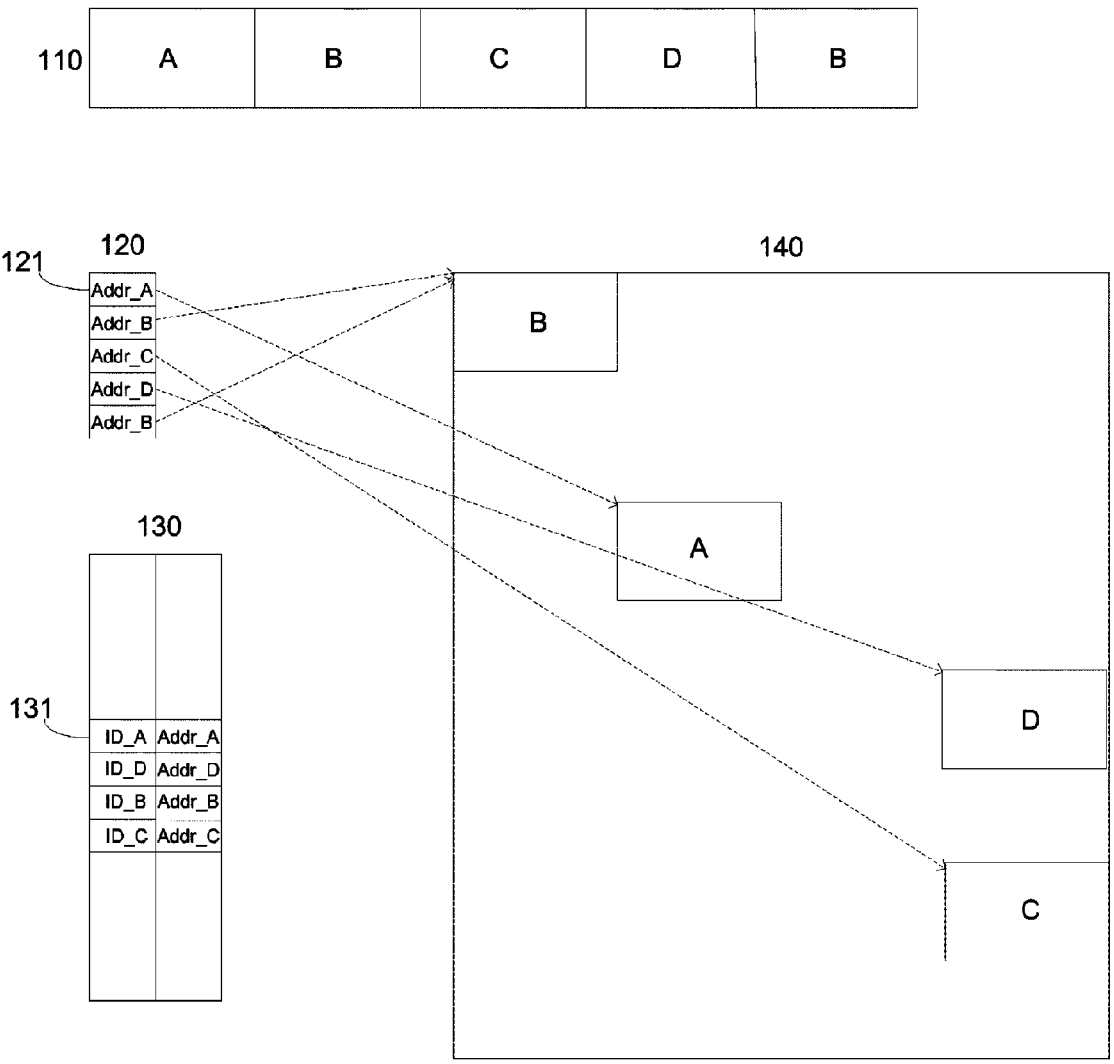
FIG. 1 illustrates an overview of an exemplary environment in which some examples and aspects of a process or system described herein may operate and be used.

FIG. 1 illustrates an overview of an exemplary environment in which some examples and aspects of a process or system described herein may operate and be used. An input dataset 110, e.g., a stream of backup data, is ready to be stored into repository 140, which may be a storage disk, a tape or some other storage medium. In this example, dataset 110 is made up of repeatable sub-blocks of data: sub-blocks A, B, C, D, and B. Note that sub-block B is repeated once within dataset 110. Before sub-block A is stored into repository 140, a unique sub-block identifier ID_A, e.g. a hash value, may be calculated based on the contents of sub-block A. Sub-block identifier ID_A may then be used as a key to lookup a corresponding entry in sub-block index 130, which is a lookup table that maps a sub-block identifier to the location in the repository where an exact copy of the sub-block is stored. Sub-block index 130 may be implemented as a hash table that associates sub-block identifiers as keys with sub-block addresses in the repository as values. Sub-block index 130 may also be implemented as other data structures that are designed for efficient search, low space overhead, fast entry insertion or deletion, or the like.

In this example, because sub-block A is a new sub-block that has never been stored into repository 140, ID_A does not match any of the entries in sub-block index 130. Accordingly, sub-block A is stored into repository 140 at address Addr_A. A sub-block index entry 131 is also entered into sub-block index 130 with ID_A as the key and Addr_A as the value. Lastly, Addr_A is stored as part of a set of metadata 120 representing input dataset 110. More specifically, input dataset 110 is represented by a set of metadata 120 that includes reference pointers to the locations in the repository where the sub-blocks that make up the dataset physically reside, and Addr_A is stored as the first of these reference pointers, namely pointer 121.

Sub-block A is then followed by sub-blocks B, C, and D in dataset 110. Sub-blocks B, C, and D are processed the same way as sub-block A described above because, like sub-block A, they are also new sub-blocks that have never been stored into repository 140. Accordingly, a copy of each of sub-blocks B, C, and D is stored in repository 140, and their addresses in repository 140 are stored in metadata 120. An entry for each of these sub-blocks is entered into sub-block index 130. As shown in FIG. 1, the sub-blocks need not be stored as sequential or contiguous blocks in repository 140. The entries in sub-block index 130 need not be stored in sequential order either. It should also be recognized that in some exemplary embodiments, the sub-blocks may have different lengths.

When the first duplicate sub-block B in dataset 110 is processed, its sub-block identifier ID_B matches one of the entries in sub-block index 130. The retrieved entry contains Addr_B, the location in the repository where a copy of sub-block B resides. This address is then stored in metadata 120 to represent the duplicate sub-block B in dataset 110. However, no additional copy of sub-block B is stored in repository 140, and no new entry is inserted into sub-block index 130. Duplication of identical sub-blocks in the repository is thus avoided.

Although each sub-block index entry occupies very little space, sub-block index 130 may potentially contain a very large number of sub-block index entries. This is because an entry is needed to reference each sub-block stored in repository 140 and the total number of sub-blocks may be very high. As a result, sub-block index 130 may be too big to fit into memory; instead, it is stored on a storage medium that typically has slower random access time, e.g., a disk. Therefore, sub-block index lookups may be costly in terms of access time.

Another reason why sub-block index lookups are potentially costly is that the metadata for a sub-block may be stored with the sub-block and not within the index. Consequently, matching a sub-block would require two I/O operations: reading the entry in the index, and then reading the sub-block's meta-data. In order to reduce the number of sub-block index lookups and thereby increase efficiency of the storage system, the current matched data, i.e., the current matched sub-block, may be used to predict the location of the next sub-block within an input dataset. Conceptually, if past data stored in repository 140 indicates that there is a high probability that sub-block A is followed by sub-block B, then an exemplary system may store this "A to B" link information, including the address of sub-block B, in sub-block A's metadata (data about sub-block A). When sub-block A is encountered again in a dataset, the system may follow this "A to B" link and use the stored next sub-block address to retrieve sub-block B directly, without performing any index lookups. By storing the link information in sub-block A's metadata, a potential extra I/O operation associated with the index lookup may be avoided.

Prediction of the location of the next sub-block based on the current sub-block is possible because the distribution of sub-blocks within various input datasets is generally not a random distribution. For example, when backup datasets from three consecutive days are stored, there is a high probability that most of the contents of the three datasets are similar. There is also a high probability that the order of the sub-blocks within the datasets is similar. Suppose backup dataset N and N+1 both contain sub-block A, followed by sub-block B:

Dataset N= . . . AB . . .
Dataset N+1= . . . AB . . .

If backup dataset N+2 also contains sub-block A, then there is a high probability that sub-block A is followed by sub-block B as well in dataset N+2:

Dataset N+2= . . . AB . . .

Therefore, given a current sub-block in a dataset, it may be possible to predict the next sub-block in the dataset.

Figure 2A:
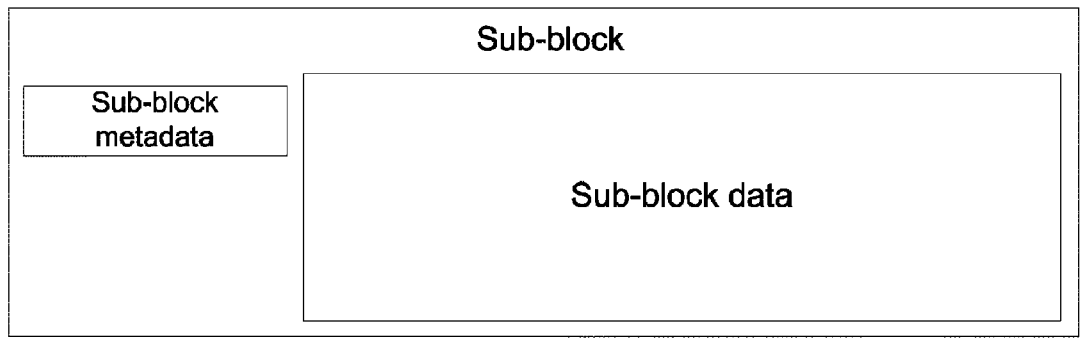
FIG. 2A illustrates an exemplary sub-block data structure.

FIGS. 2A, 2B, 2C, 3A, and 3B describe various exemplary data structures for the present invention. FIG. 2A illustrates an exemplary sub-block structure, which contains a set of sub-block data and its corresponding set of sub-block metadata. Note that the set of sub-block metadata is distinguished from metadata 120 in FIG. 1. The latter represents an input dataset.

Figure 2B:
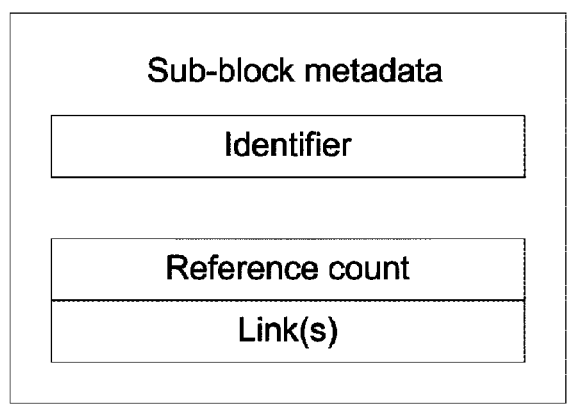
FIG. 2B illustrates an exemplary set of sub-block metadata.
Figure 2C:
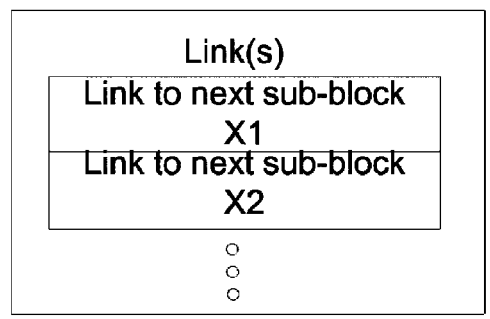
FIG. 2C illustrates an exemplary link data structure.

FIG. 2B illustrates an exemplary set of sub-block metadata, which includes the following fields: identifier, length, reference count, and link(s). The identifier field contains the sub-block identifier, e.g., a unique hash value calculated based on the contents of the sub-block. The length field contains the length of the sub-block data. This length may be in bytes, kilobytes, megabytes, or the like, and typically ranges from 8 kilobytes to 32 kilobytes. The reference count field contains the reference count of the sub-block, which is the number of reference pointers pointing to the sub-block. For example, if input dataset 110 in FIG. 1 has two occurrences of sub-block B and a second input dataset has one occurrence of sub-block B, then the reference count is set to three because there are a total of three references to sub-block B in repository 140. When a sub-block is first stored in repository 140, the reference count is initialized to one. Each time there is a match in an input dataset with the sub-block, the reference count is incremented by one. One purpose of the reference count is to prevent a sub-block from being deleted or de-allocated until there are no longer any pointers referencing it. Lastly, the link(s) field contains the link information from the current sub-block to the predicted next sub-block(s). As shown in FIG. 2C, the link(s) field contains a list of links from the current sub-block to a predicted next sub-block. In some exemplary embodiments, these links are sorted in decreasing probability. For example, a link to the most likely next sub-block may be located at the top of the list and a link to the least likely next sub-block may be located at the bottom.

Figure 3A:
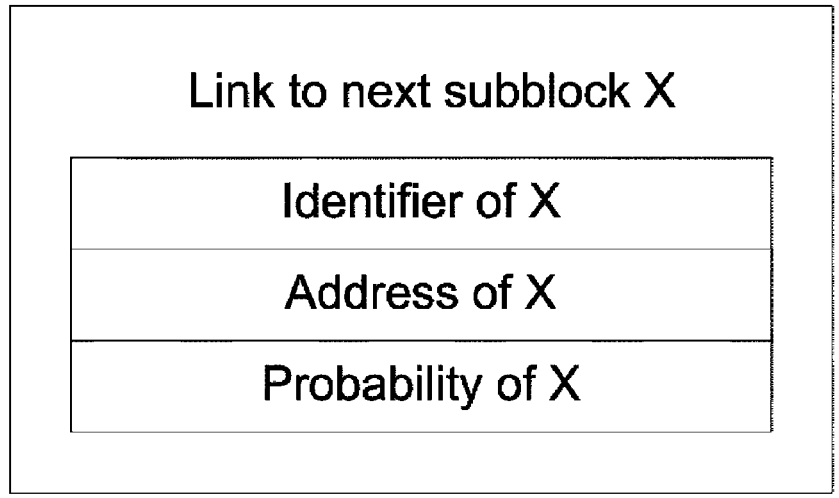
FIG. 3A illustrates an exemplary data structure for storing a link from the current sub-block to a predicted next sub-block.
Figure 3B:
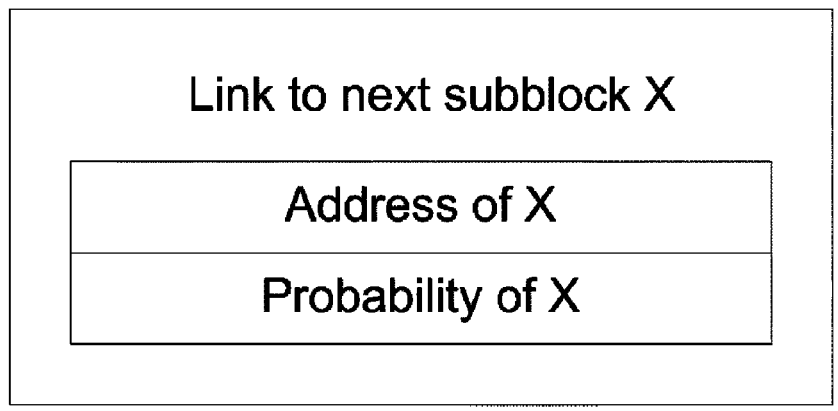
FIG. 3B illustrates another exemplary data structure for storing a link from the current sub-block to a predicted next sub-block.

FIG. 3A and FIG. 3B each illustrates an exemplary data structure for storing a link from the current sub-block to a predicted next sub-block X. In other words, the data structure provides information about next sub-block X for the prediction that given the current sub-block, the next sub-block is X. Note that there can be multiple predicted next sub-blocks, each having its own set of link information.

In FIG. 3A, the link structure has three fields: identifier of X, address of X, and probability of X. The identifier of X field contains the sub-block identifier for X. The address of X field contains the address of sub-block X in repository 140. The probability of X field contains an estimate of the likelihood that the next sub-block is X. For example, if there has been a total of ten occurrences of sub-block A and in nine out of the ten occurrences, sub-block A was followed by sub-block B, then the metadata of sub-block A may contain a link to next sub-block B and the probability of B may be set to 90%. The probability of X field may alternatively be replaced by a count of how many times sub-block A is followed by B. This count may be divided by the reference count in sub-block A's metadata to give the probability of B. In FIG. 3B, the link structure has only two fields: address of X and probability of X. Note that the identifier of X is not stored in this exemplary link data structure. The link structure of FIG. 3A requires more memory for storage, but has the advantage that the identifier of X field is present and can be used for the purpose of matching the sub-block. With this link structure, the probability of X field is not required for matching the sub-block; rather, the probability or count may be used to track the usage patterns of the links, so that lightly used links may be deleted or replaced with more popular links so as to conserve memory usage. The link structure of FIG. 3B does not store the identifier of X field, and thus has the advantage of requiring less memory. In this case, the probability of X field is potentially useful for matching the sub-block, since it may form the basis for deciding whether or not to follow the link: if the probability is sufficiently high, the link may be followed; if the probability is low, the link is not followed and a sub-block index lookup may be performed instead.

Figure 4:
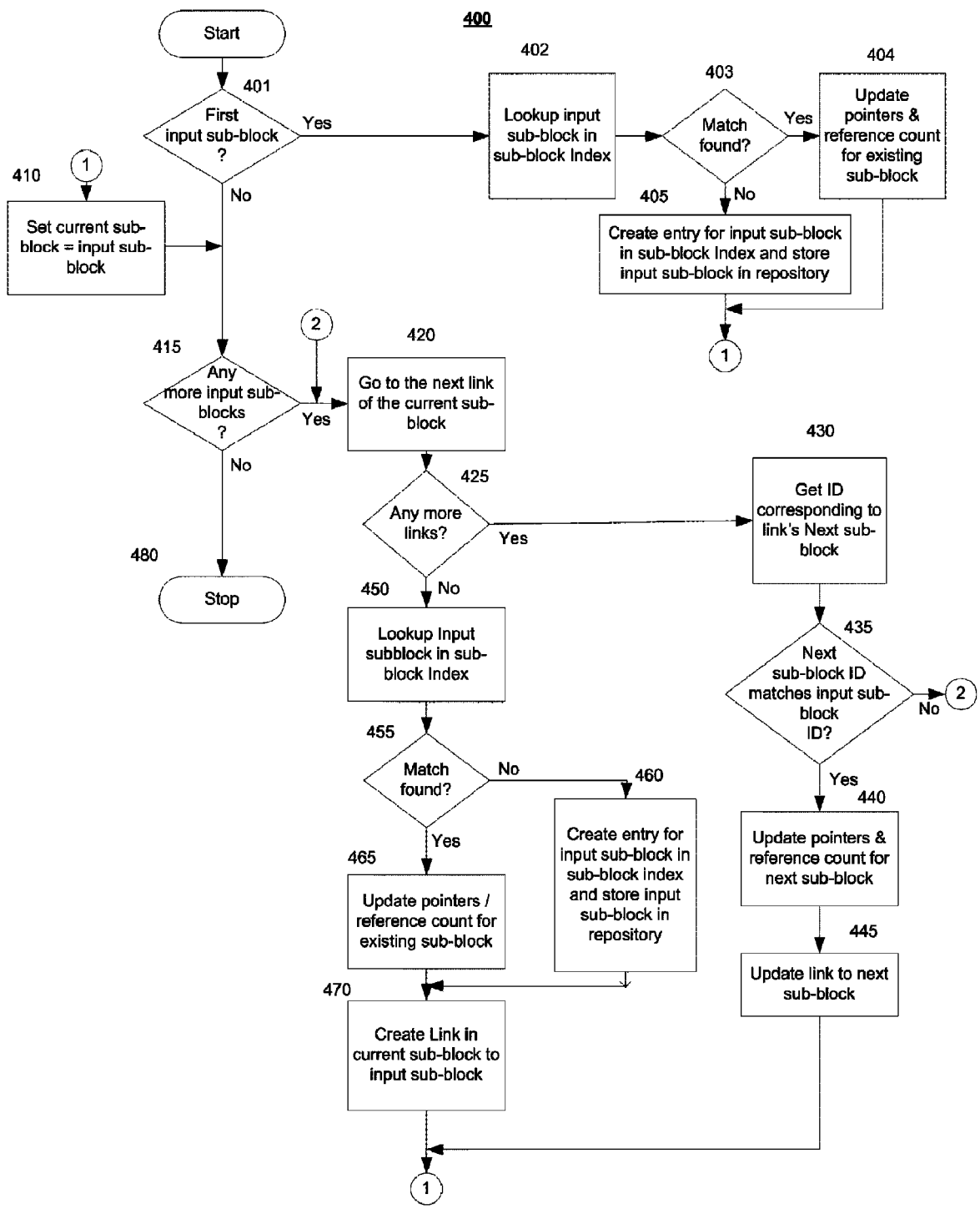
FIG. 4 illustrates an exemplary process 400 for storing an input dataset into a repository.

FIG. 4 illustrates an exemplary process 400 for storing an input dataset into repository, e.g., repository 140. With continued reference to FIG. 1 and FIG. 4, from 401 to 405, process 400 handles the special case when the process is storing the very first input sub-block within a dataset into repository 140. Prediction is generally based on at least one previously "matched" sub-block and there are none immediately preceding the first input sub-block. Thus, in the exemplary embodiment, processing of the first input sub-block is performed by doing a sub-block index lookup at 402. The sub-block identifier for the first input sub-block is calculated based on the content of the first input sub-block. This sub-block identifier is then used as a key to lookup a corresponding entry in sub-block index 130. If a match is found at 403, the address of the existing sub-block in repository 140 stored in the retrieved entry is then stored in metadata 120 and the reference count of the existing sub-block in repository 140 is incremented by one at 404. If a match is not found at 403, the input sub-block is stored into repository 140 and a new sub-block index entry is entered into sub-block index 130 at 405. The address of the newly created sub-block in repository 140 is also stored in metadata 120. In an alternative embodiment, the first input sub-block may be predicted based upon information derived from previous input datasets. For example, the first input sub-block may be predicted as being the most frequently occurring first input sub-block from the n most recent previous input datasets, where n is a positive number.

From 410 to 470, process 400 handles the general case when the process is not storing the very first input sub-block within a dataset into repository 140. At 410, a pointer to the current sub-block is updated. At 415, process 400 checks whether there are any more input sub-blocks to process. If there are no more input sub-blocks to process, process 400 terminates at 480.

From 420 to 435, the links in the current sub-block are traversed one by one until either a link's predicted next sub-block's identifier actually matches with the input sub-block's identifier or all the links are exhausted. In the former case, one of the links correctly predicts the next sub-block. The address of the next sub-block may be retrieved from the link data structure directly and a costly sub-block index lookup is thus avoided. At 440, the reference count for the existing next sub-block is incremented and a pointer reference to the existing sub-block in the repository matching the input sub-block is created. The link probability or count may be updated at 445 before another input sub-block is processed again at 410. In the case where all of the links are exhausted without a match, the links fail to predict the next sub-block. Accordingly, a sub-block index lookup is performed as shown at 450. If a match is found, the address of the existing sub-block in the repository is stored in metadata 120 and the reference count for the existing sub-block is incremented, as shown at 465. If there is no match, a new index entry and a new repository entry are created for the input sub-block, as shown at 460. In either case, a new link may be created (block 470) before another input sub-block is processed again at 410.

Figure 5:
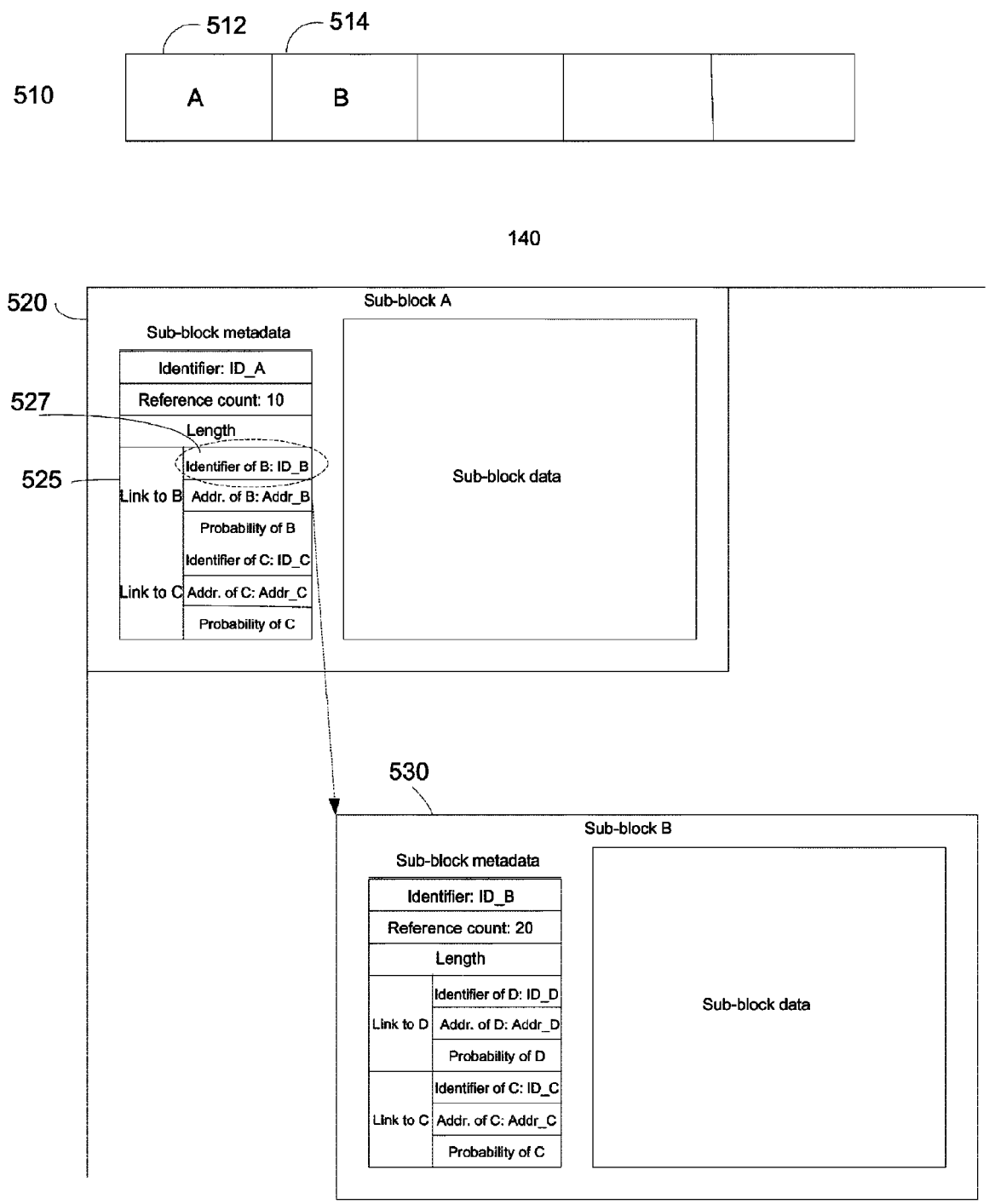
FIG. 5 illustrates an example of matching a link's predicted next sub-block's identifier with the input sub-block's identifier.

The determination of whether a link's predicted next sub-block's identifier actually matches with the input sub-block's identifier can be explained by way of example. As shown in FIG. 5, sub-block A 512 is followed by sub-block B 514 in an input dataset 510. After sub-block A 512 is matched with sub-block A 520 in repository 140, the links in sub-block A 520 are examined to determine whether any of the link's predicted next sub-block's identifier matches with sub-block B 514's identifier. In this example, the link structure is identical to that of FIG. 3A and has three fields: identifier of predicted next sub-block (X), address of X, and probability of X. Since the identifier of X is readily available in the link field, a simple comparison of this value with the input sub-block's identifier would yield an answer as to whether there is a match or not. For example, ID_B (see 527) in link 525 is compared with the input block's identifier. If the two match, then Addr_B in link 525 may be assigned to metadata 120 (see FIG. 1) without looking up sub-block index 130 (see FIG. 1). It should be recognized that after sub-block A 512 is matched, updating of sub-block A 520's metadata—including the reference count for sub-block A 520—is already needed. Therefore, the incremental overhead of accessing the identifier of predicted next sub-block (X), comparing the identifier with the input block's identifier, and loading the address of X in the link structure is small compared to that of a full sub-block index lookup.

Figure 6:
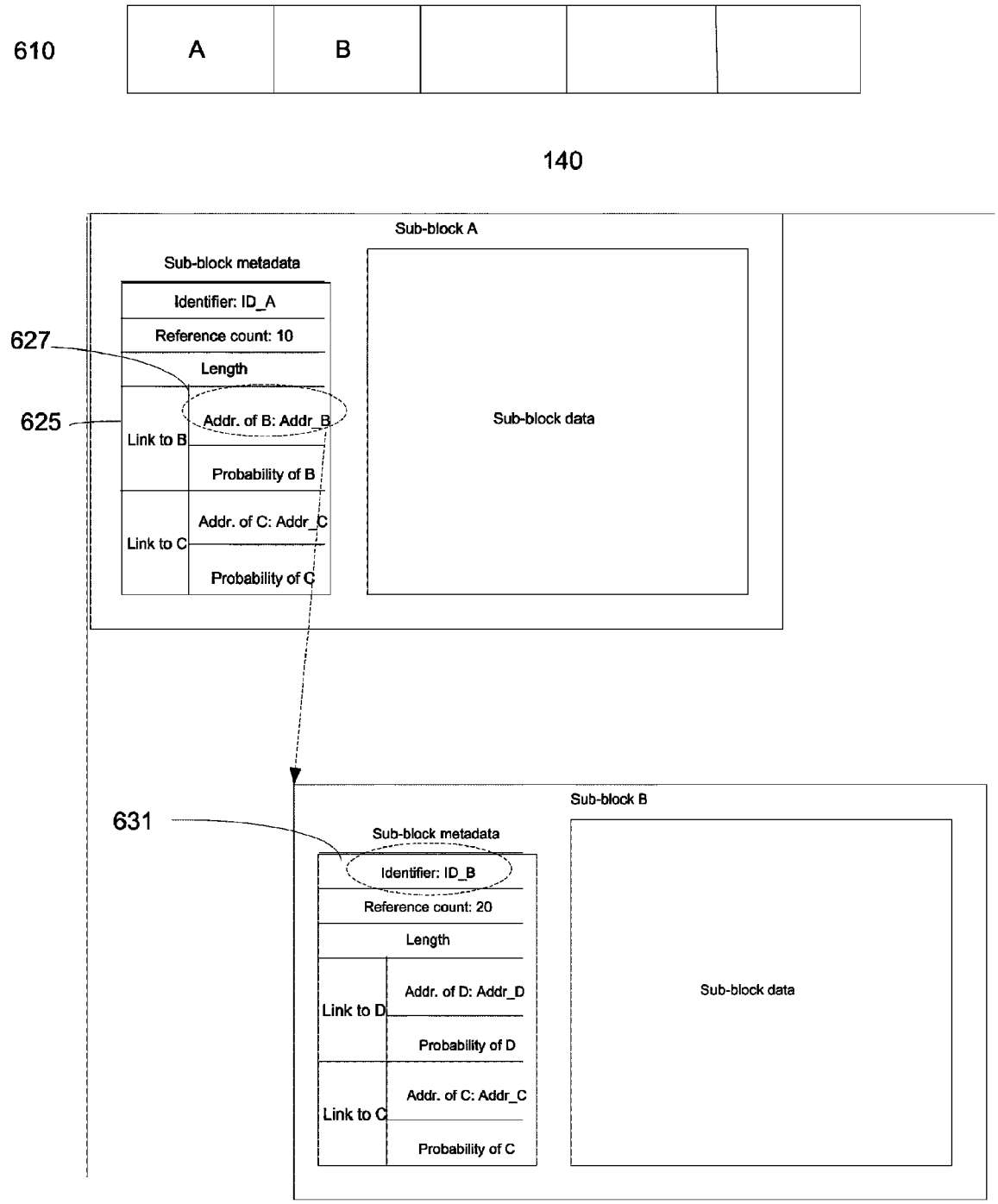
FIG. 6 illustrates another example of matching a link's predicted next sub-block's identifier with the input sub-block's identifier.

FIG. 6 shows a second example with a similar input dataset as FIG. 5. The difference is that the link structure is identical to that of FIG. 3B, which has only two fields: address of predicted next sub-block (X) and probability of X. In one exemplary embodiment, only a link with a sufficiently high probability will be followed. Here, the identifier of X is not stored in the link structure. However, since the address of X (see 627) is known, the identifier of X may be retrieved (see 631) by accessing X's metadata. Similar to the previous example of FIG. 5, if this identifier ID_B matches with the input sub-block's identifier, then Addr_B (see 627) in link 625 may be assigned to metadata 120 (see FIG. 1) without looking up sub-block index 130 (see FIG. 1).

Links in a sub-block may be updated in different ways. In one exemplary embodiment, a link is not modified once it has been set. For example, if sub-block A is first stored in repository 140 and it is followed by B, then an "A to B" link may be stored in sub-block A's metadata without any subsequent changes. Note that in this exemplary embodiment, a probability of X field (see FIGS. 3A and 3B) in the link structure may not be necessary. However, if a probability of X field is present, it may be used to sort the links based on the probability of each link. This sorting may then be used to prioritize which links to remove as the set of links grows in size. Alternatively, a threshold probability may be set, and all links with probabilities below the threshold may be removed so as to maintain sufficient memory for storing links of higher probabilities.

In another exemplary embodiment, a link may be reset each time that a wrong prediction is observed. For example, an "A to B" link may be created after the sequence of sub-block A followed by sub-block B has been observed once. If sub-block A is later observed to be followed by sub-block C, then the "A to B" link may either be deleted from the sub-block metadata or replaced by an "A to C" link.

In another exemplary embodiment, an "A to B" link may be set to an active state only if sub-block A has been observed to be followed by sub-block B more than n times, where n may be a predetermined value set by a user, e.g., a system administrator. When the "A to B" link is set to an inactive state, the link is not used for predicting the next sub-block, though the link information may continuously be updated.

In yet another exemplary embodiment, a sub-block may have multiple links within its metadata but only the link with the highest probability is used to predict the next sub-block. For example, sub-block A may be followed by sub-block B 30% of the time, sub-block C 10% of the time, and sub-block D 60% of the time based on past data. When there is a match with sub-block A again, only the "A to D" link is looked up and compared with the input block following sub-block A. If the input block's identifier does not match with sub-block D's identifier, then the remaining links in sub-block A's metadata may be skipped and a sub-block index lookup may follow.

In another exemplary embodiment, a sub-block may have multiple links within its metadata but only links with probabilities higher than a predetermined value may be used to predict the next sub-block. For example, sub-block A may be followed by each of sub-blocks B, C, D, and E 25% of the time based on past data. Since the probability for each link is low, the cost of looking into the wrong links and comparing them with the input block may be higher than a sub-block index lookup. Therefore, when there is a match with sub-block A again, the sub-block index may instead be searched immediately without using any of the links for prediction.

The invention may be implemented in a computing system which employs a cache. A cache is a memory subsystem that allows for relatively fast access of data. In one embodiment, whether or not a link resides in cache is one of the criteria for deciding whether the particular link or its related links should be followed. Since a cache read access is relatively fast, a link resides in cache may be followed even if its associated probability is relatively low. For example, suppose sub-block A is followed by sub-block X1 with 40% probability, sub-block X2 with 40% probability and sub-block X3 with 20% probability. Furthermore, suppose that a threshold probability of 50% is used for deciding whether to follow a link. Since the probabilities for X1, X2 and X3 all lie below threshold, in the absence of a cache criterion, none of the links would be followed. However, suppose the link to sub-block X1 resides in cache. According to the cache criterion, the link to sub-block X1 may be followed, since the I/O access time to do so is relatively short. Suppose there is no match with sub-block X1. Then, conditioned on this information, the probabilities that sub-blocks X2 and X3 follow A will increase to 66% and 33% respectively, and the link to sub-block X2 may then potentially become a candidate for lookup.

In one exemplary embodiment, a prediction of the location of the next sub-block may be based on the last n sub-blocks instead of merely based on the current sub-block as discussed above. A prediction based on the last n sub-blocks may be made by using an $n^{th}$ order Markov chain.

FIG. 7 illustrates an exemplary link data structure for a second order Markov chain. A prediction of the next sub-block (sub-block (n+1)) is based on the current sub-block (sub-block (n) and its preceding sub-block (sub-block (n−1)). For example, if the current sub-block is sub-block A, the probability of the next sub-block may be different for each of the sequences AA, BA, CA, and DA. Accordingly, a different set of links for each of the sequences AA, BA, CA, and DA may be maintained in sub-block A's metadata. Generally, higher order Markov chains offer more accurate predictions, but may require more meta-data storage.

For a first order Markov chain, if every sub-block maintains a next sub-block link to every sub-block in repository 140, the number of possible links is the number of sub-blocks squared. For an n-th order Markov chain, the number of possible links is the number of sub-blocks raised to the (n+1)-th power. Given that repository 140 may contain billions or even trillions of sub-blocks, the number of links that would need to be maintained is potentially very large. In one embodiment, the problem of too many links is solved by maintaining only a limited number of links for each sub-block. For example, if the number of links is limited to three per sub-block, then for a first order Markov chain, the number of possible links is at most thrice the number of sub-blocks in repository 140. This method takes advantage of the fact that sub-blocks are generally not randomly distributed amongst an input dataset; when a single sub-block is matched, there will generally only be a small subset of sub-blocks that could follow.

A link structure need not always reference a next sub-block. In another embodiment, the number of links is reduced by making use of a cluster data structure. A cluster is a group of sub-blocks: sub-blocks are generally stored in clusters in de-duplication software repositories, and a cluster typically contains sub-blocks that may have been stored at the same proximate time or in the same input dataset. Rather than predicting the location of the next sub-block based on one or more past sub-blocks, the cluster method predicts which cluster is most likely to contain the next sub-block given one or more past clusters. Since a cluster may contain hundreds or thousands of sub-blocks, an $n^{th}$ order Markov Chain linking clusters of sub-blocks will generally have significantly fewer links than an $n^{th}$ order Markov Chain linking the individual sub-blocks. Hence, the amount of memory required to store the links is potentially greatly reduced.

Figure 8A:
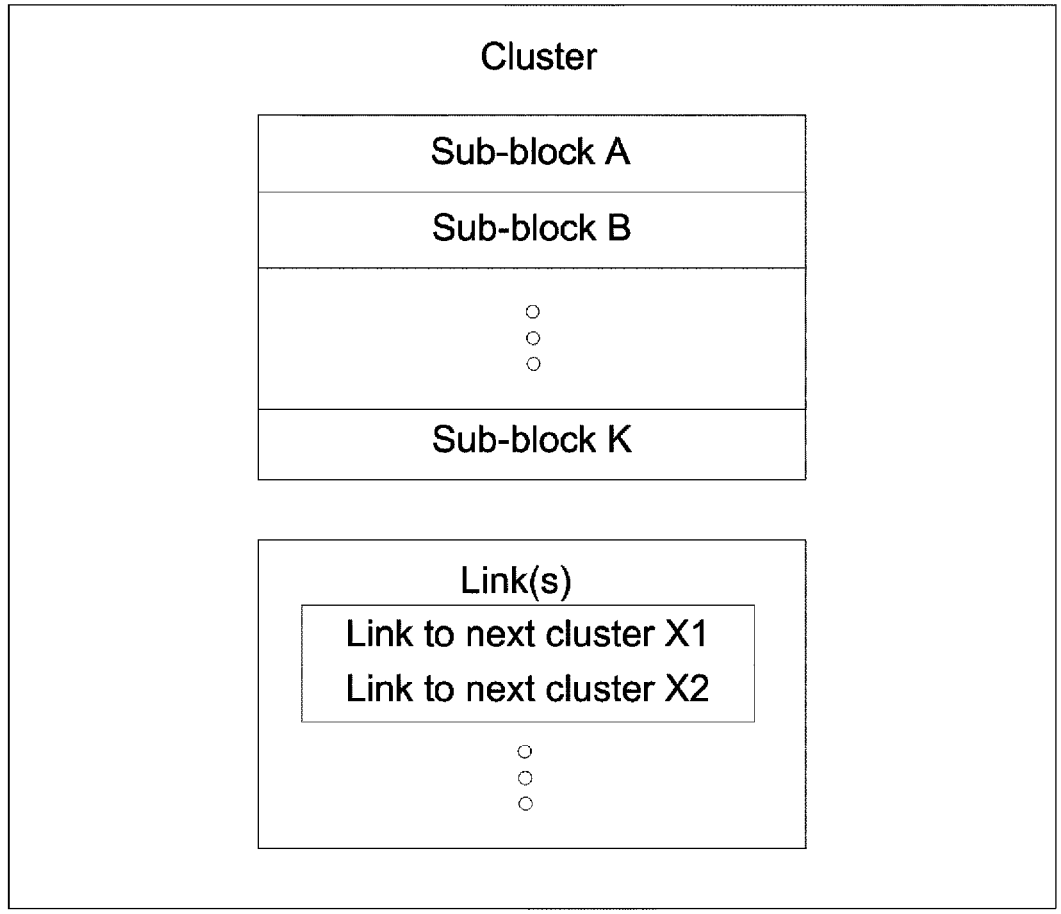
FIG. 8A illustrates an exemplary cluster.
Figure 8B:
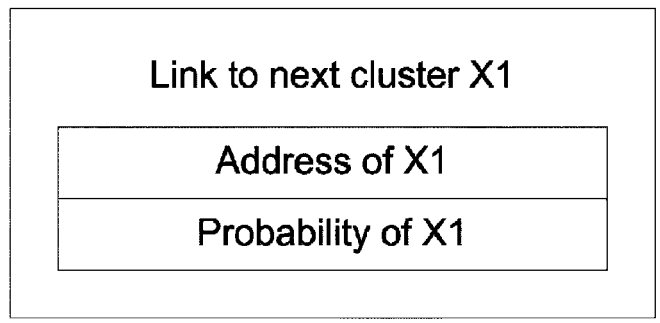
FIG. 8B illustrates an exemplary link data structure for predicting a next cluster.
Figure 8C:
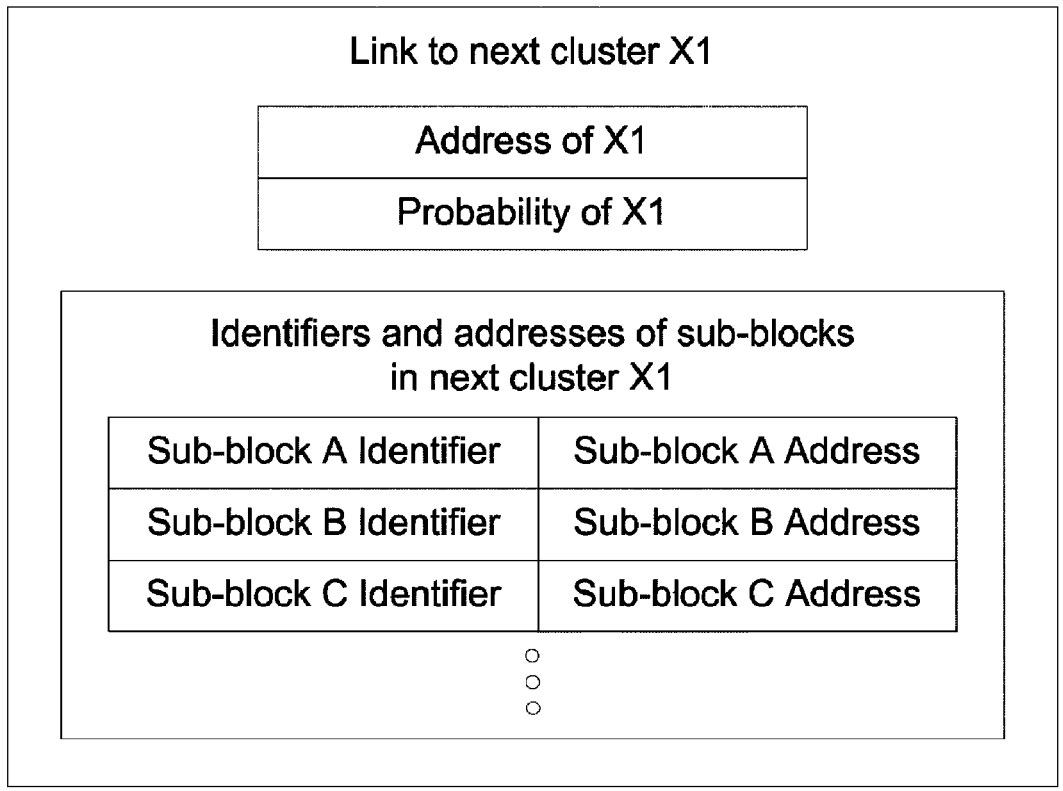
FIG. 8C illustrates another exemplary link data structure for predicting a next cluster X1.

As illustrated in FIG. 8A, a cluster consists of a group of sub-blocks and a group of links to next clusters. There are many ways of implementing a link to a next cluster. In one embodiment, a link to a next cluster X contains a probability (or count) field, measuring the relative likelihood that the next sub-block is in the next cluster X, and a field containing the address of next cluster X (FIG. 8B). The link's probability can be examined to determine whether it is worth loading the next cluster at the location given by the address field in order to find the location of the input sub-block: if the probability is low, it may be preferable to directly perform a sub-block index lookup instead. In another embodiment, a link to a next cluster X contains a probability (or count) field, a next cluster address field, and a table of identifiers and addresses of all sub-blocks belonging to cluster X (FIG. 8C). In this case, the probability field need not be examined in order to find a match for the input sub-block. Instead, the identifier of the input sub-block can be looked up in the link's table of sub-blocks to directly determine whether there is a match or not. The link probability is only needed for performing link maintenance; for example, to determine whether to delete the link entirely if the link probability becomes sufficiently low.

Figure 9:
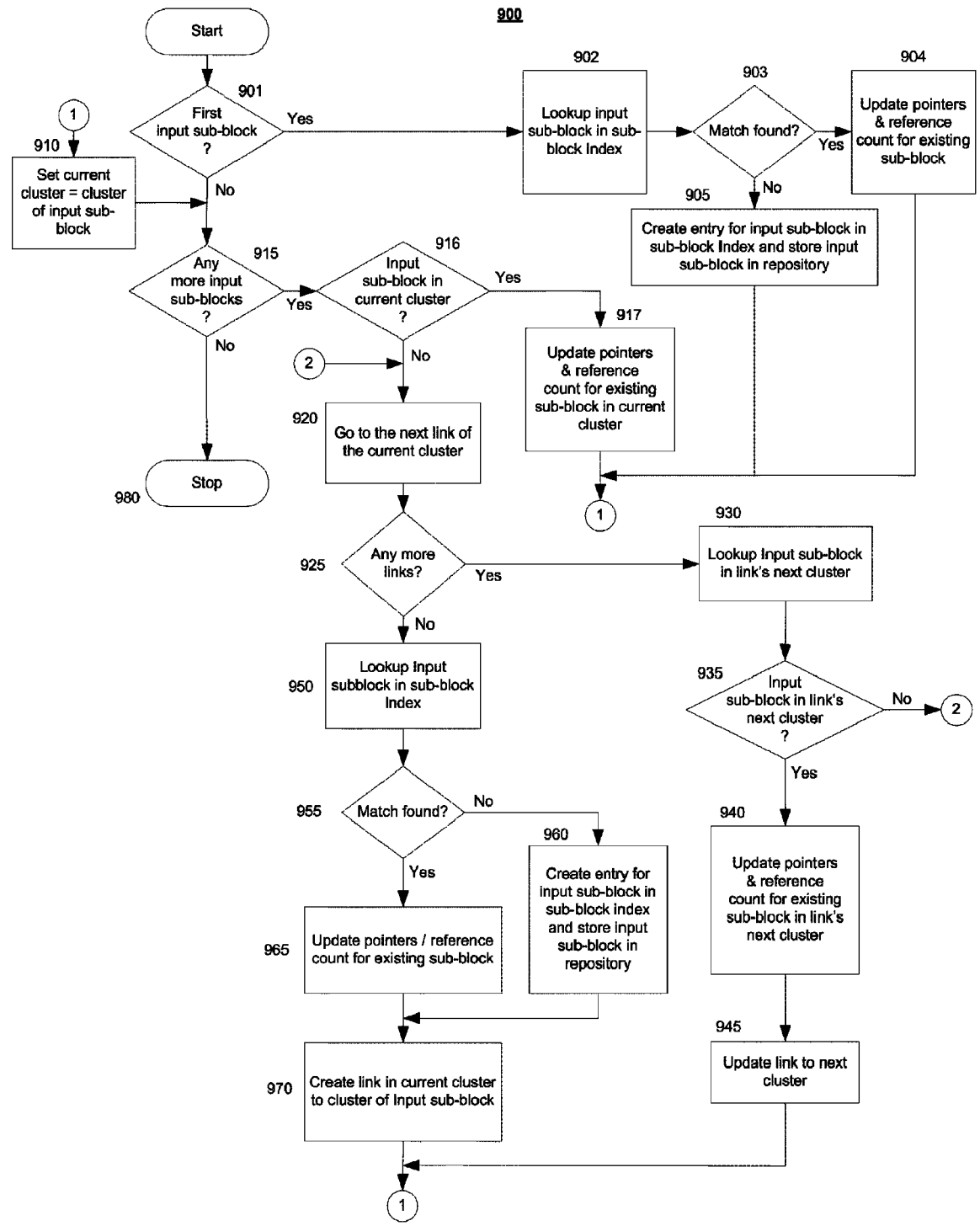
FIG. 9 illustrates another exemplary process for storing an input dataset into repository.

With continued reference to FIG. 1, FIG. 9 illustrates an exemplary process 900 for storing an input dataset into repository 140 (see FIG. 1) using clusters, which potentially requires less memory storage than process 400. From 901 to 905, process 900 handles the special case when the process is storing the very first input sub-block within a dataset into repository 140. As there are no previously "matched" sub-block immediately preceding the first input sub-block, processing of the first input sub-block is performed by doing a sub-block index lookup at 902. The sub-block identifier for the first input sub-block is calculated based on the content of the first input sub-block. This sub-block identifier is then used as a key to lookup a corresponding entry in sub-block index 130 (see FIG. 1). If a match is found at 903, the address corresponding to the retrieved entry is then stored in metadata 120 (see FIG. 1) and the reference count of the existing sub-block in repository 140 is incremented by one at 904. If a match is not found at 903, the input sub-block is stored into repository 140 and a new sub-block index entry is entered into sub-block index 130 at 905. The address of the newly created sub-block in repository 140 is also stored in metadata 120. In an alternative embodiment, the first input sub-block may be predicted based upon information derived from previous input datasets. For example, the first input sub-block may be predicted as being the most frequently occurring first input sub-block from the n most recent previous input datasets, where n is a positive number.

From 910 to 970, process 900 handles the general case when the process is not storing the very first input sub-block within a dataset into repository 140. At 910, a pointer to the current cluster is updated. At 915, process 900 checks whether there are any more input sub-blocks to process. If there are no more input sub-blocks to process, process 900 terminates at 980.

In many instances, a sub-block and the next sub-block following it may both be in the same cluster. Hence, at 916, the input sub-block is initially examined to determine whether it belongs to the current cluster. If so, the address of the existing sub-block which matches the input sub-block is stored in metadata 120 and the reference count for the existing sub-block is incremented (block 917), and another input sub-block may then be processed at 910. If not, then the links in the current cluster are traversed one by one until either a link's predicted next cluster actually matches with the cluster of the input sub-block or all the links are exhausted (blocks 920 to 935). In the former case, one of the links correctly predicts the next cluster. The address of the next sub-block may be retrieved from the next cluster data structure and a sub-block index lookup is thus avoided. At 940, the reference count for the existing next sub-block is incremented and the address reference to the existing sub-block matching the input sub-block is stored in metadata 120. The probability or usage count of the matching link may be updated in 945 before another input sub-block is processed again at 910. In the case where all of the links are exhausted without a match, the links fail to predict the next cluster. Accordingly, a sub-block index lookup is performed as shown at 950. If a match is found, the address of the input sub-block is stored in metadata 120 and the reference count for the existing sub-block is incremented, as shown at 965. If there is no match, a new index entry and a new repository entry are created for the input sub-block, as shown at 960. In either case, a link may be created (block 970) before another input sub-block is processed again at 910.

Those of ordinary skill in the art will recognize that hybrid combinations of process 400 and/or process 900 are also possible. In one embodiment, prediction of the location of the next sub-block may be based on one or more past clusters. In another embodiment, prediction of the cluster most likely to contain the next sub-block may be based on one or more past sub-blocks. Other combinations are also possible. Additionally, while both process 400 and process 900 describe the traversal of the links as done in sequential fashion for ease of explanation, it should not be interpreted that this is the only manner. For example, in process 400, links to the next sub-blocks may be stored in a hash table keyed on the sub-block identifier, thereby allowing random access lookup of the links. The links may also be implemented as other data structures that are designed for efficient search, low space overhead, fast entry insertion or deletion, or the like.

Many of the techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices. Moreover, each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Figure 10:
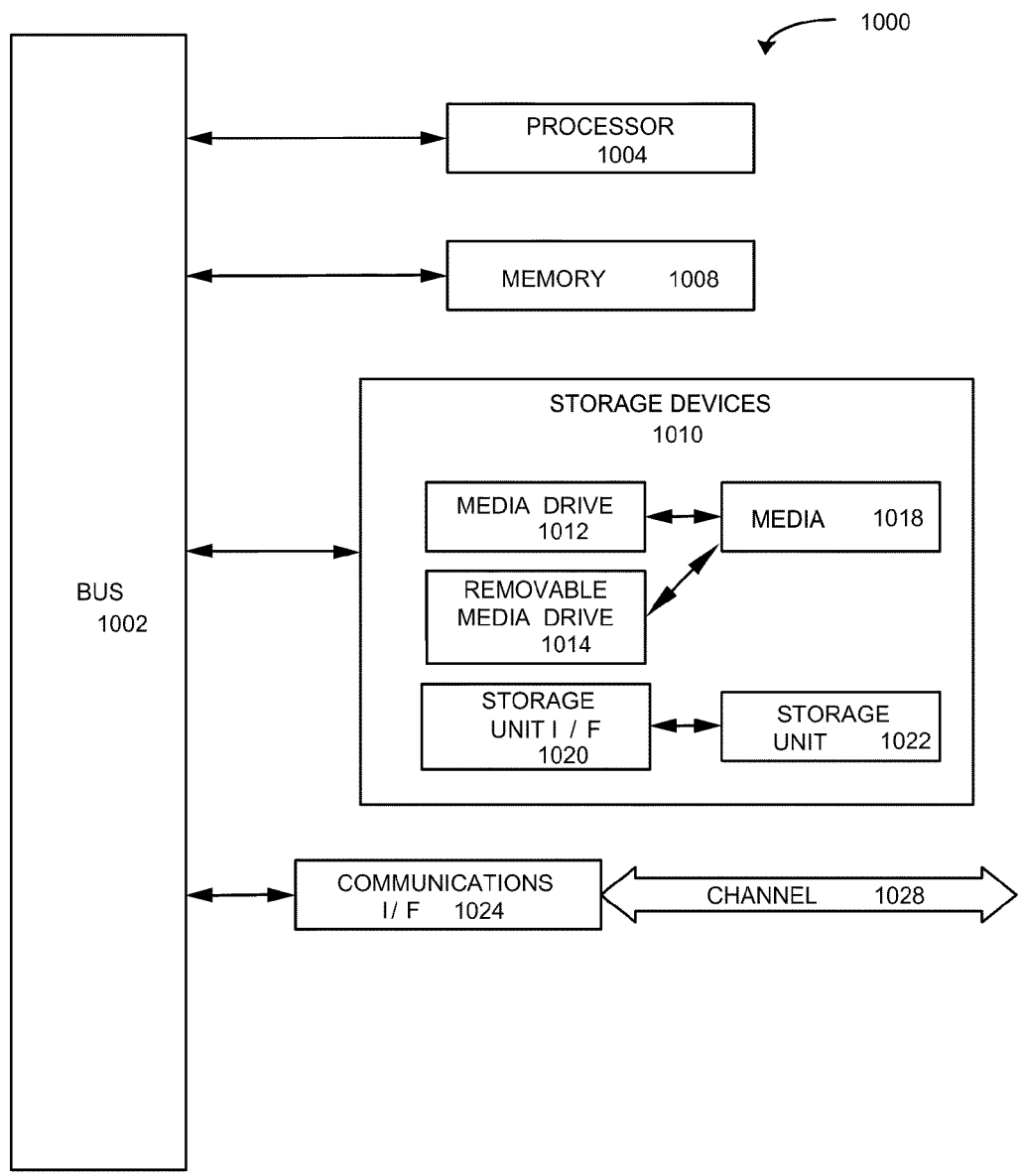
FIG. 10 illustrates an exemplary computing system that may be employed to implement some or all processing functionality in certain embodiments of the invention.

FIG. 10 illustrates an exemplary computing system 1000 that may be employed to implement processing functionality for various aspects of the invention. Those skilled in the relevant art will also recognize how to implement the invention using other computer systems or architectures. Computing system 1000 may represent, for example, a user device such as a desktop, mobile phone, personal entertainment device, DVR, and so on, a mainframe, server, or any other type of special or general purpose computing device as may be desirable or appropriate for a given application or environment. Computing system 1000 can include one or more processors, such as a processor 1004. Processor 1004 can be implemented using a general or special purpose processing engine such as, for example, a microprocessor, microcontroller or other control logic. In this example, processor 1004 is connected to a bus 1002 or other communication medium.

Computing system 1000 can also include a main memory 1008, preferably random access memory (RAM) or other dynamic memory, for storing information and instructions to be executed by processor 1004. Main memory 1008 also may be used for storing temporary variables or other intermediate information during execution of instructions to be executed by processor 1004. Computing system 1000 may likewise include a read only memory ("ROM") or other static storage device coupled to bus 1002 for storing static information and instructions for processor 1004.

The computing system 1000 may also include information storage mechanism 1010, which may include, for example, a media drive 1012 and a removable storage interface 1020. The media drive 1012 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 1018 may include, for example, a hard disk, floppy disk, magnetic tape, optical disk, CD or DVD, or other fixed or removable medium that is read by and written to by media drive 1012. As these examples illustrate, the storage media 1018 may include a computer-readable storage medium having stored therein particular computer software or data.

In alternative embodiments, information storage mechanism 1010 may include other similar instrumentalities for allowing computer programs or other instructions or data to be loaded into computing system 1000. Such instrumentalities may include, for example, a removable storage unit 1022 and an interface 1020, such as a program cartridge and cartridge interface, a removable memory (for example, a flash memory or other removable memory module) and memory slot, and other removable storage units 1022 and interfaces 1020 that allow software and data to be transferred from the removable storage unit 1022 to computing system 1000.

Computing system 1000 can also include a communications interface 1024. Communications interface 1024 can be used to allow software and data to be transferred between computing system 1000 and external devices. Examples of communications interface 1024 can include a modem, a network interface (such as an Ethernet or other NIC card), a communications port (such as for example, a USB port), a PCMCIA slot and card, etc. Software and data transferred via communications interface 1024 are in the form of signals which can be electronic, electromagnetic, optical, or other signals capable of being received by communications interface 1024. These signals are provided to communications interface 1024 via a channel 1028. This channel 1028 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product" and "computer-readable medium" may be used generally to refer to media such as, for example, memory 1008, storage device 1018, storage unit 1022, or signal(s) on channel 1028. These and other forms of computer-readable media may be involved in providing one or more sequences of one or more instructions to processor 1004 for execution. Such instructions, generally referred to as "computer program code" (which may be grouped in the form of computer programs or other groupings), when executed, enable the computing system 1000 to perform features or functions of embodiments of the present invention.

In an embodiment where the elements are implemented using software, the software may be stored in a computer-readable medium and loaded into computing system 1000 using, for example, removable storage drive 1014, drive 1012 or communications interface 1024. The control logic (in this example, software instructions or computer program code), when executed by the processor 1004, causes the processor 1004 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed:

1. A computer enabled method of storing an input dataset in a storage medium, the method comprising:
   storing a copy for each of a plurality of repeatable blocks of data in an input dataset in a storage medium;
   finding a location in the storage medium of the copy of a block of data in the input dataset, wherein finding the location comprises: determining a most likely location in the storage medium of the copy of the block of data from one or more blocks of data preceding the block of data based on statistics of past stored data; and if the determined most likely location contains a block of data that matches with the actual block of data, retrieving the location in the storage medium of the copy of the block of data; and
   storing the location of the copy of the block of data,
   wherein the copy for each of the plurality of repeatable blocks of data is associated with a corresponding set of metadata,
   wherein determining the most likely location in the storage medium of the copy of the block of data comprises one of:
      determining using an $n^{th}$ order Markov chain,
      determining from a block of data preceding the block of data using a first order Markov chain, and
      determining from two blocks of data preceding the block of data using a second order Markov chain.

2. The method of claim 1, wherein the statistics of past stored data comprises statistics of the order of past stored data, and wherein the statistics is stored in one or more sets of metadata, and wherein the one or more sets of metadata are associated with the copy of the one or more blocks of data preceding the block of data.

3. The method of claim 1, wherein retrieving the location in the storage medium of the copy of the block of data comprises accessing one or more sets of metadata, and wherein the one or more sets of metadata are associated with the copy of the one or more blocks of data preceding the block of data.

4. The method of claim 1, wherein storing the location of the copy of the block of data comprises storing the location in a set of metadata representing the input dataset.

5. A non-transitory computer-readable storage medium comprising computer executable instructions for storing an input dataset in a storage medium, the instructions comprising:
   storing a copy for each of a plurality of repeatable blocks of data in an input dataset in a storage medium;
   finding a location in the storage medium of the copy of a block of data in the input dataset, wherein finding the location comprises:
      determining a most likely location in the storage medium of the copy of the block of data from one or more blocks of data preceding the block of data based on statistics of past stored data; and if the determined most likely location contains a block of data that matches with the actual block of data, retrieving the location in the storage medium of the copy of the block of data; and storing location of the copy of the block of data, wherein the copy for each of the plurality of repeatable blocks of data is associated with a corresponding set of metadata, wherein determining the most likely location in the storage medium of the copy of the block of data comprises one of:

determining using an $n^{th}$ order Markov chain, determining from a block of data preceding the block of data using a first order Markov chain, and determining from two blocks of data preceding the block of data using a second order Markov chain.

6. The non-transitory computer-readable storage medium of claim 5, wherein the statistics of past stored data comprises statistics of the order of past stored data, and wherein the statistics is stored in one or more sets of metadata, and wherein the one or more sets of metadata are associated with the copy of the one or more blocks of data preceding the block of data.

7. The non-transitory computer-readable storage medium of claim 5, wherein retrieving the location in the storage medium of the copy of the block of data comprises accessing one or more sets of metadata, and wherein the one or more sets of metadata are associated with the copy of the one or more blocks of data preceding the block of data.

8. The non-transitory computer-readable storage medium of claim 5, wherein storing the location of the copy of the block of data comprises storing the location in a set of metadata representing the input dataset.

9. A computer enabled method of storing an input dataset in a storage medium, the method comprising:

storing a copy for each of a plurality of repeatable blocks of data in an input dataset in a storage medium, wherein each copy is associated with one of a plurality of clusters;

finding a location in the storage medium of the copy of a block of data in the input dataset, wherein finding the location comprises:

determining a most likely location in the storage medium of a first cluster from a second at least one cluster based on statistics of past stored data, wherein the first cluster is associated with the block of data, and wherein the second at least one cluster is associated with the one or more blocks of data preceding the block of data; and if the determined most likely location contains a first cluster associated with the block of data, retrieving the location in the storage medium of the copy of the block of data;

and storing the location of the copy of the block of data, wherein each of the plurality of clusters is associated with a corresponding set of metadata, wherein determining the most likely location in the storage medium of the first cluster comprises one of:

determining from a cluster associated with a block of data preceding the block of data using a first order Markov chain, determining from one or more clusters associated with two blocks of data preceding the block of data using a second order Markov chain.

10. The method of claim 9, wherein the statistics of past stored data comprises statistics of the order of past stored data, and wherein the statistics is stored in one or more sets of metadata associated with one or more clusters, and wherein the one or more clusters are associated with the copy of the one or more blocks of data preceding the block of data.

11. The method of claim 9, wherein retrieving the location in the storage medium of the copy of the block of data comprises accessing one or more sets of metadata associated with one or more clusters, and wherein the one or more clusters are associated with the copy of the one or more blocks of data preceding the block of data.

12. Computer-readable storage medium comprising computer executable instructions for storing an input dataset in a storage medium, the instructions comprising:

storing a copy for each of a plurality of repeatable blocks of data in an input dataset in a storage medium, wherein each copy is associated with one of a plurality of clusters;

finding a location in the storage medium of the copy of a block of data in the input dataset, wherein finding the location comprises:

determining a most likely location in the storage medium of a first cluster from a second at least one cluster based on statistics of past stored data, wherein the first cluster is associated with the block of data and the second at least one cluster is associated with the one or more blocks of data preceding the block of data; and if the determined most likely location contains a first cluster associated with the block of data, retrieving the location in the storage medium of the copy of the block of data;

and storing the location of the copy of the block of data, wherein each of the plurality of clusters is associated with a corresponding set of metadata, wherein determining the most likely location in the storage medium of the first cluster comprises one of:

determining from a cluster associated with a block of data preceding the block of data using a first order Markov chain, and determining from one or more clusters associated with two blocks of data preceding the block of data using a second order Markov chain.

13. The computer-readable storage medium of claim 12, wherein the statistics of past stored data comprises statistics of the order of past stored data, and wherein the statistics is stored in one or more sets of metadata associated with one or more clusters, and wherein the one or more clusters are associated with the copy of the one or more blocks of data preceding the block of data.

14. The computer-readable storage medium of claim 12, wherein retrieving the location in the storage medium of the copy of the block of data comprises accessing one or more sets of metadata associated with one or more clusters, and wherein the one or more clusters are associated with the copy of the one or more blocks of data preceding the block of data.

* * * * *